June 24, 1930.  H. FELDMEIER  1,766,618
HEAT EXCHANGE APPARATUS
Original Filed Oct. 10, 1921   2 Sheets-Sheet 1
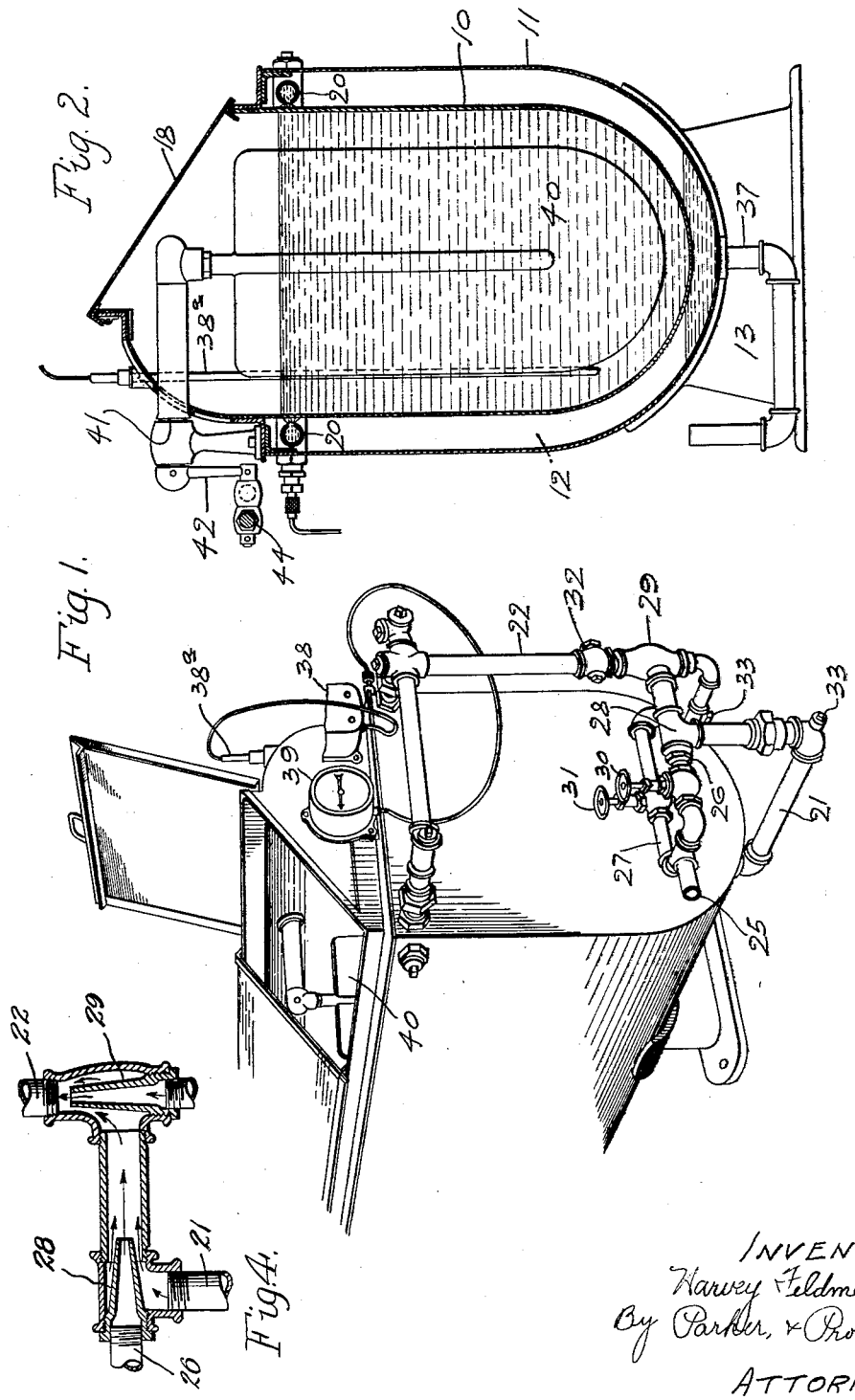

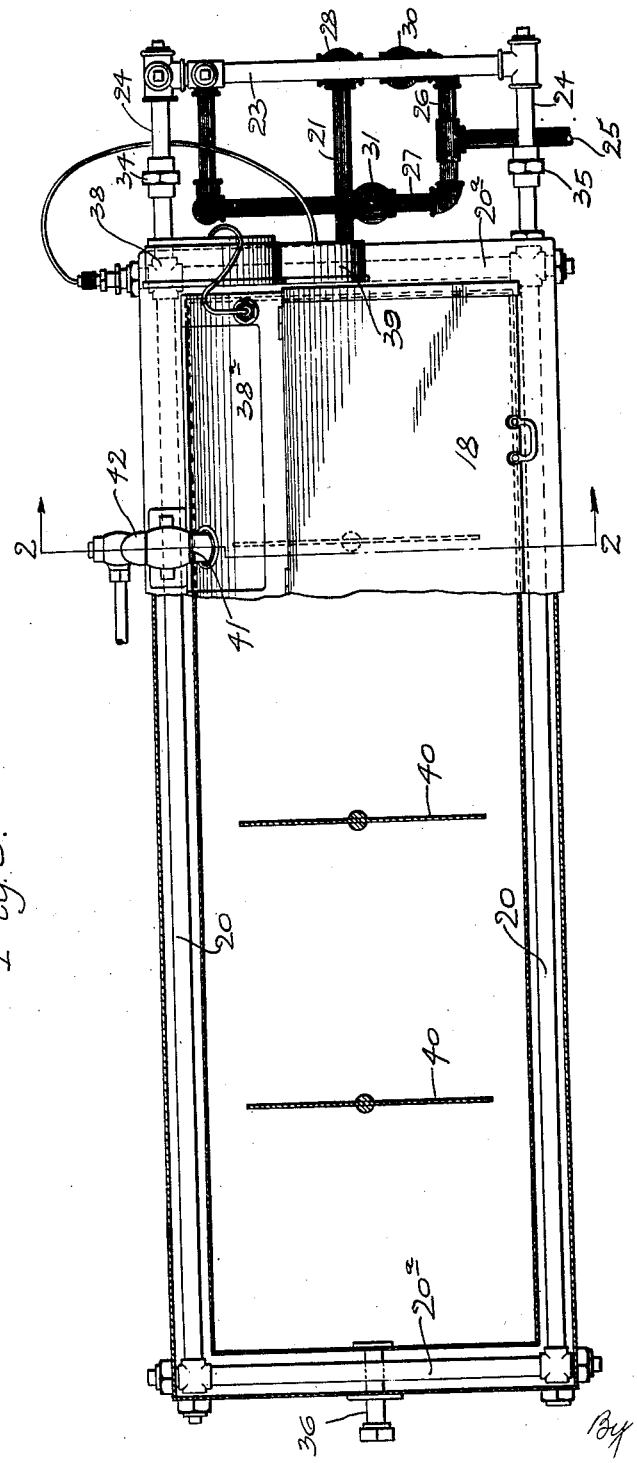

Patented June 24, 1930

1,766,618

UNITED STATES PATENT OFFICE

HARVEY FELDMEIER, OF LITTLE FALLS, NEW YORK, ASSIGNOR, BY MESNE ASSIGNMENTS, TO CHERRY-BURRELL CORPORATION, OF WILMINGTON, DELAWARE, A CORPORATION OF DELAWARE

HEAT-EXCHANGE APPARATUS

Original application filed October 10, 1921, Serial No. 506,647. Divided and this application filed August 4, 1925. Serial No. 48,159.

This invention relates to improvements in liquid pasteurizers, heaters or coolers of the so called "batch" or "vat" type in which the liquid to be pasteurized, heated or cooled is placed in bulk in a vat and is heated or cooled by causing a heating or cooling liquid to flow in a film over the outer surface of the walls of the vat. A well known machine of this type comprises a jacket forming an air space around the vat to insulate the vat and reduce radiation, spray pipes for discharging the temperature changing liquid against the outer surface of the vat so that it will flow in a film over such surface, a pump for circulating the temperature changing liquid, a heater for the same, and means for agitating the liquid in the vat so as to cause the different portions thereof to contact with the walls of the vat and thus increase the rapidity of exchange of heat between the liquid in the vat and the temperature changing or tempering medium.

The present application is a division of my co-pending application for Letters Patent filed October 10, 1921, Serial No. 506,647, apparatus for heating and cooling liquids.

The object of this invention is to provide a spray vat liquid pasteurizer, heater or cooler of the type mentioned with simple, efficient and economically operable means whereby a large, uniform and active flow or circulation of the temperature changing medium is insured; and to provide a simple and practical means for readily and accurately controlling the temperature of said temperature changing medium to give the required results.

Other objects are to improve apparatus of this sort in the other respects hereinafter specified and set forth in the claims.

In the accompanying drawings:

Fig. 1 is a perspective view of one end of the apparatus showing means embodying the invention for circulating and controlling the temperature of the temperature changing liquid.

Fig. 2 is a transverse sectional elevation of the machine or apparatus on line 2—2 Fig. 3.

Fig. 3 is a plan view, partly in horizontal section, thereof.

Fig. 4 is an elevation partly in section of the jet device by which the water is circulated and its temperature controlled.

The machine herein disclosed as an embodiment of the invention is primarily intended for heating milk or other liquid too, and holding it for the required length of time at the proper temperature for pasteurization, the subsequent cooling of the milk or liquid being performed in a separate cooler. While, for the sake of brevity and clearness of description, the machine is hereinafter described as a liquid heater, it will be understood that its construction is such that it is also adapted for cooling liquids if desired, by using a cooling medium instead of a heating medium.

10 represents the vat or vessel in which the milk or other liquid to be heated is placed, and which is preferably of the shape shown, having approximately vertical side and end walls and a rounded or semi-cylindrical bottom. This vat, which is made of some good heat conducting material, such as sheet copper, is arranged within an outer jacket or casing 11 which forms a support for the vat and also an air space around the same to insulate the vat and reduce the radiation of heat therefrom. The jacket or casing is preferably of substantially similar shape to the vat but of sufficiently larger dimensions to form the air space 12 between the walls of the vat and of the jacket. 13 represents supporting legs or stands of any suitable construction for the jacket 11.

The rear wall of the vat 10 preferably curves upwardly and inwardly, and the vat is closed by a sectional cover or lid 18 hinged to the curved top, thereby forming a hood or closed upper portion for the vat.

The water or other liquid for heating the milk or liquid in the vat is sprayed or discharged against the outer surface of the walls of the vat, preferably by spray pipes arranged in the air space between the vat 10 and the jacket 11. 20 represents two of these spray pipes extending lengthwise of the vat in the upper portions of the space 12 between the front and rear walls of the vat and the jacket and provided with holes along their inner sides through which the heating liquid is discharged against the walls of the vat. Similar pipes 20ᵃ are also preferably arranged crosswise at the ends of the machine between the end walls of the vat and the jacket and connected with the spray pipes 20 by cross couplings at the corners of the vat, or other suitable connections. The liquid flows down the walls of the vat and runs off of the rounded bottom of the vat into the bottom of the jacket from which it is preferably returned by suitable pipe connections to the spray pipes, the liquid being recirculated or used over and over again. Preferably the liquid is caused to circulate and is heated and its temperature regulated by a steam driving jet or ejector which is of a construction adapted to cause an active circulation of the liquid, and a supplemental or tempering steam jet or connection under the control of a regulating valve, whereby the temperature of the circulating liquid can be accurately regulated. The connections shown for this purpose are arranged as follows:

21 represents a return or suction pipe which extends from the bottom of the jacket or casing 11, and 22 indicates a main supply pipe which is connected by a cross pipe 23 and suitable connections 24 to the adjacent ends of the two longitudinal spray pipes 20. 25 represents a steam supply pipe which is provided with two branches 26 and 27. Connected in the liquid circulating system between the return pipe 21 and supply pipe 22 is a steam ejector or driving jet device 28, and a supplemental or tempering steam jet or suction T 29. The branch steam pipe 26 connects with the ejector or jet 28 which acts to draw the liquid from the bottom of the jacket or casing 11, drive the same through the supply pipe 22 and discharge the liquid from the spray pipes 20 and 20ᵃ. The other branch steam pipe 27 connects with the tempering steam jet or suction T 29. The two branch steam pipes 26 and 27 are equipped with regulating valves 30 and 31 respectively so that the two steam jet devices 28 and 29 can be separately controlled by appropriate adjustments of their respective valves 30 and 31. The steam driving jet or ejector 28 can be an ordinary steam ejector of well known construction having a Venturi nozzle adapted to produce circulation of the heating liquid through the pipes 21, 22 and the spray pipes, and the tempering jet 29 can be an ordinary suction T. The driving jet or ejector 28 is properly proportioned to produce active circulation of a large volume of the liquid and to heat the circulating liquid partially, but not completely, to the required temperature, the additional heat necessary to bring the liquid up to the required temperature being supplied by the temperature regulating jet 29. In this way an active and substantially uniform circulation and heating of the liquid nearly to the required temperature is produced by the driving jet or ejector 28 and the supplemental jet 29 has to supply only the additional heat required to bring the liquid up to temperature. This additional heating can be readily and very accurately regulated as required without noticeable change in the flow of the liquid, by adjustment of the controlling valve 31. The temperature of the heating liquid can be gradually increased or altered as required to heat the milk or liquid in the vat to a predetermined temperature and to maintain it at this temperature as long as necessary, and a substantially constant ample circulation of the liquid is ensured by the primary or driving jet or ejector 28.

The liquid supply pipe 22 is preferably provided with a shut-off cock 32 and suitable drain plugs or valves 33 are shown in the lower portions of the return pipe 21 and branch steam pipe 27 for draining out the pipe connections when necessary. Suitable unions or nipples 34 and 35 are also preferably provided in the pipe connections between the main supply pipe 22 and the spray pipes so as to permit the convenient connection of supply pipes for cold water or a cooling medium in case it should be desired to cool the liquid in the vat, although in the ordinary operation of the machine it is preferred to run the liquid out of the vat through a discharge pipe or connection 36, and cool it in a separate cooler.

37 indicates an overflow pipe connected with the bottom of the jacket or casing 11 and having an upturned outer end, see Fig. 2, whereby the level to which heating liquid can collect in the bottom of the jacket or casing, as indicated in Fig. 2, is determined.

38 represents a recording thermometer having its thermo-responsive element 38ᵃ entering the vat 10 to show and record the temperatures of the liquid being heated, and 39 represents a thermometer having its thermoresponsive element entering one of the spray pipes 20ᵃ to indicate the temperature of the spray liquid. The required conditions, as shown by these thermometers, can be readily obtained by regulating the steam jets 28 and 29 by appropriate adjustments of the valves 30 and 31. For example, it takes about twenty to twenty-five minutes to heat a vat of milk from say 50° F. to 145° F. The operator watches the thermometer 39 which indicates the temperature of the circulating water, and keeps that at about 160° F. to 170° F., and when the milk gets up to 145° F., as shown by the thermometer 38, he shuts off the steam from both jets 28 and 29. The air space 12 between the vat and the jacket prevents any material falling off in temperature during the holding period. If preferred, however, the steam jets can be regulated to give a reduced flow of the circulating water at a temperature which will prevent any drop in temperature of the milk during the holding period.

40 represents the agitators or paddles for agitating the liquid in the vat to cause all portions thereof to come into contact with the walls of the vat so as to ensure more uniform and rapid heating of the liquid. Any suitable number of these agitators or paddles can be employed.

Any suitable actuating means for the paddles 40 may be used, such for example as a rock shaft 41 for each paddle and which is connected to a rock arm 42, oscillated by a pitman 44, connected to suitable drive mechanism (not shown). Any other suitable agitating means and drive mechanism therefor could be used.

The means described for controlling the flow and the temperature of the temperature changing medium is very efficient and practical and ensures prompt and accurate control of the temperature of the substance being heated. The use of the second steam jet changes and controls the temperature of the heating medium without materially changing the speed of flow thereof.

I claim as my invention:

1. In an apparatus for changing the temperature of a substance, in which a flowing temperature changing medium is used, the combination of a vat containing the substance, discharge means arranged to produce a flowing film of the temperature changing medium on the outer surface of said vat, means associated with said discharge means to form a closed circuit in which said medium is adapted to circulate, means for directing into said circuit at one point thereof, a driving fluid jet to circulate said temperature changing medium through said circuit continuously, means for controlling said driving jet to regulate the rate of flow of the temperature changing medium, and means for admitting to said circuit at another point thereof a supplemental fluid jet which alters the temperature of said circulating medium and is controllable independently of said driving jet for regulating the temperature of said circulating temperature changing medium.

2. In an apparatus for changing the temperature of a substance, in which a flowing temperature changing medium is used, the combination of a heat interchanger containing said substance, means associated in heat interchanging relation therewith and forming a closed circuit system through which the temperature changing medium may be circulated repeatedly, means for injecting a fluid jet into said system in a manner to forcibly circulate said temperature changing medium through said circuit continuously, and separate means for adding to said circulating medium, a temperature modifying fluid which alters the temperature of said circulating medium, said means both being separately controllable for regulating the temperature and rate of flow of said circulating temperature changing medium.

3. In an apparatus for changing the temperature of a substance in which a temperature changing liquid medium is used, the combination of a heat interchanger containing such substance, means associated in heat interchanging relation therewith and forming a closed circuit system through which said medium is circulated repeatedly, a steam ejector in said system for forcibly circulating said medium and partially heating it, and means for admitting steam to said medium in said system separately from said ejector to complete the heating of the circulating medium.

4. In an apparatus for heating liquids, the combination of a vat containing the liquid, discharge means arranged to produce a flowing film of a heating liquid on the outer surface of said vat, circulating connections for returning the heating liquid leaving the vat to said discharge means in a closed circulatory system, a steam ejector connected to said system to inject therein a jet of steam in a manner to cause a forced circulation of said heating liquid through said system and a partial heating of said heating liquid, a separate supplemental steam supply device also connected to said system for further raising the temperature of the heating liquid without materially affecting the rate of flow of said heating liquid in said system, and means for controlling the supply of steam from said supplemental device for regulating the temperature of the heating liquid.

5. In an apparatus for heating liquid, the combination of a vat containing the liquid, discharge means arranged to produce a flowing film of a heating medium on the outer surface of said vat, circulating connections for returning the heating medium leaving the vat to said discharge means in a closed circulatory system, a steam ejector connected to said system to inject therein a jet of steam in a manner to cause a forced circulation of said heating medium through said circulatory system and a partial heating of said medium, a separate supplemental steam supply device also connected to said system at a point between the ejector and said discharge means for further raising the temperature of the heating medium without material modification of the rate of flow of said medium in said system, and separate controlling means for said ejector and said supplemental steam supply device for independently regulating the flow and the temperature of the heating medium.

6. Apparatus for changing the temperature of a substance, which comprises a closed circulating system containing a heat transfer medium, means for circulating and partially heating said medium, and separate adjustable means for admitting steam to said circulating medium in said system to supply desired additional heat and provide a sensitive temperature control for the circulating medium.

HARVEY FELDMEIER.